(12) United States Patent
Izawa

(10) Patent No.: US 10,126,537 B2
(45) Date of Patent: Nov. 13, 2018

(54) MARKER

(71) Applicant: Enplas Corporation, Saitama (JP)

(72) Inventor: Takahiro Izawa, Saitama (JP)

(73) Assignee: ENPLAS CORPORATION, Saitama (JP)

(*) Notice: Subject to any disclaimer, the term of this patent is extended or adjusted under 35 U.S.C. 154(b) by 0 days.

(21) Appl. No.: 15/704,203

(22) Filed: Sep. 14, 2017

(65) Prior Publication Data

US 2018/0003933 A1   Jan. 4, 2018

Related U.S. Application Data

(63) Continuation of application No. 15/126,380, filed as application No. PCT/JP2015/057587 on Mar. 13, 2015.

(30) Foreign Application Priority Data

Mar. 18, 2014  (JP) ................... 2014-055129
Mar. 5, 2015  (JP) ................... 2015-043620

(51) Int. Cl.
*G02B 17/00* (2006.01)
*G02B 17/08* (2006.01)
*G02B 3/00* (2006.01)

(52) U.S. Cl.
CPC ........... *G02B 17/08* (2013.01); *G02B 3/005* (2013.01); *G02B 3/0056* (2013.01)

(58) Field of Classification Search
CPC ...................................... G02B 17/08
USPC ......................................... 359/727
See application file for complete search history.

(56) References Cited

U.S. PATENT DOCUMENTS

| 5,359,454 A | 10/1994 | Steenblik et al. |
| 2008/0037131 A1 | 2/2008 | Steenblik et al. |
| 2011/0286092 A1 | 11/2011 | Chung |

(Continued)

FOREIGN PATENT DOCUMENTS

| EP | 2386899 A1 | 11/2011 |
| JP | 43-004478 Y1 | 2/1968 |

(Continued)

OTHER PUBLICATIONS

International Search Report from International Application No. PCT/JP2015/057587 dated Jun. 2, 2015.

(Continued)

*Primary Examiner* — James Jones
(74) *Attorney, Agent, or Firm* — Brundidge & Stanger, P.C.

(57) ABSTRACT

A marker includes a plurality of convex lenses each including a plurality of convex lenses each including a convex surface part on a front side; and a plurality of patterns formed on a rear surface of the plurality of convex lenses, each pattern corresponding to the convex surface part. Each of the plurality of patterns is composed of optically distinguishable first and second parts formed by a surface shape of the rear surface. The second part is disposed on each corresponding convex surface part. A distance between optical axes of the convex lenses which are adjacent is constant. A distance between centers of the second parts which are adjacent is different from the distance between the optical axes.

5 Claims, 8 Drawing Sheets

(56) References Cited

U.S. PATENT DOCUMENTS

| | | | |
|---|---|---|---|
| 2012/0099199 A1* | 4/2012 | Vasylyev | B29D 11/00278 |
| | | | 359/530 |
| 2013/0003354 A1 | 1/2013 | Meis et al. | |
| 2014/0049829 A1 | 2/2014 | Yumoto et al. | |
| 2015/0210106 A1 | 7/2015 | Sun et al. | |
| 2017/0082843 A1 | 3/2017 | Izawa | |

FOREIGN PATENT DOCUMENTS

| | | |
|---|---|---|
| JP | 2012-145559 A | 8/2012 |
| JP | 2013-025043 A | 2/2013 |
| WO | 2013/177828 A1 | 12/2013 |

OTHER PUBLICATIONS

Extended European Search Report for 15764370.1 dated Dec. 13, 2017.

* cited by examiner

MARKER

CROSS REFERENCE TO RELATED APPLICATIONS

This application is a continuation of U.S. patent application Ser. No. 15/126,380, filed on Sep. 15, 2016, which is National Stage Application of International Application No. PCT/JP2015/057587, filed on Mar. 13, 2015, the disclosure of which, including the specification, drawings and abstract, is incorporated herein by reference in their entirety. International Application No. PCT/JP2015/057587 is entitled to and claims the benefit of Japanese Patent Application No. 2014-055129, filed on Mar. 18, 2014, and Japanese Patent Application No. 2015-043620, filed on Mar. 5, 2015, the disclosures of which, including the specifications, drawings and abstracts, are incorporated herein by reference in their entirety.

TECHNICAL FIELD

The present invention relates to an image display element.

BACKGROUND ART

As image display elements formed by combining a lenses and patterns, a display sheet including a lenticular lens and an image-forming layer has been known. The lenticular lens has a configuration in which a plurality of cylindrical lenses is arranged, and the image-forming layer forms the above-mentioned patterns corresponding to the respective cylindrical lenses. When the image display element is viewed from the side of convex lens parts of the cylindrical lenses, the images of the patterns are observed so as to move or deform depending on viewing positions. The above-mentioned image display elements are advantageous as a marker for recognizing the position or posture of an object in the fields of augmented reality (AR) or robotics, and have been studied as to the arrangement of the patterns in the above-mentioned use applications (see, e.g., Patent Literature (hereinafter, referred to as PTL) 1 and PTL 2).

CITATION LIST

Patent Literature

PTL 1
Japanese Patent Application Laid-Open No. 2013-025043
PTL 2
Japanese Patent Application Laid-Open No. 2012-145559

SUMMARY OF INVENTION

Technical Problem

In the above-mentioned image display elements as a marker, the positions or shapes of images to be observed are important, and thus the pattern is required to be formed at a specific position from the apex or ridge line of the lens. The image display element as a marker is preferably downsized, but the tolerable error in the planar direction of the pattern becomes smaller, for example, about several micrometers, as the image display element is downsized.

In the above-mentioned image display elements of the related art, however, the patterns of the image-forming part are formed by methods such as printing, transfer, bonding, or adhesion. Producing the image display elements using these methods is advantageous in terms of inexpensive material cost, but involves difficulty in arranging the above-mentioned patterns at intended positions as the tolerable error becomes smaller. Furthermore, when pasting the printed matter, the tolerable error at the position of the pattern further includes an error in the printing position of the printed matter, so that it may be even more difficult to arrange the patterns at intended positions in some cases. Accordingly, the production yield of the image display elements is low, and thus it is desired to improve the production yield.

An object of the present invention is to provide an image display element that can be produced at low cost and high yield.

Solution to Problem

The present invention provides a marker including a plurality of convex lenses each including a convex surface part on a front side; and a plurality of patterns formed on a rear surface of the plurality of convex lenses, each pattern corresponding to the convex surface part, in which each of the plurality of patterns is composed of optically distinguishable first and second parts formed by a surface shape of the rear surface, the second part being disposed on each corresponding convex surface part, a distance between optical axes of the convex lenses which are adjacent is constant, and a distance between centers of the second parts which are adjacent is different from the distance between the optical axes.

Advantageous Effects of Invention

The convex lens allows the pattern to be formed on the rear surface of the convex lens during production of the convex lens. Accordingly, it is possible to improve the production yield while using the same inexpensive material, compared with the production of image display elements according to the related art, which form the patterns in a step different from the production of the convex lenses. Therefore, the present invention can provide an image display element that can be produced at low cost and high yield.

DESCRIPTION OF EMBODIMENTS

Embodiment 1

An image display element according to Embodiment 1 of the present invention will be described. The image display element according to the present embodiment can be formed in a manner similar to that of the image display element or marker disclosed in the above-mentioned related art except that the method of forming the pattern is different.

(Configuration of Image Display Element)

Figure 1A:
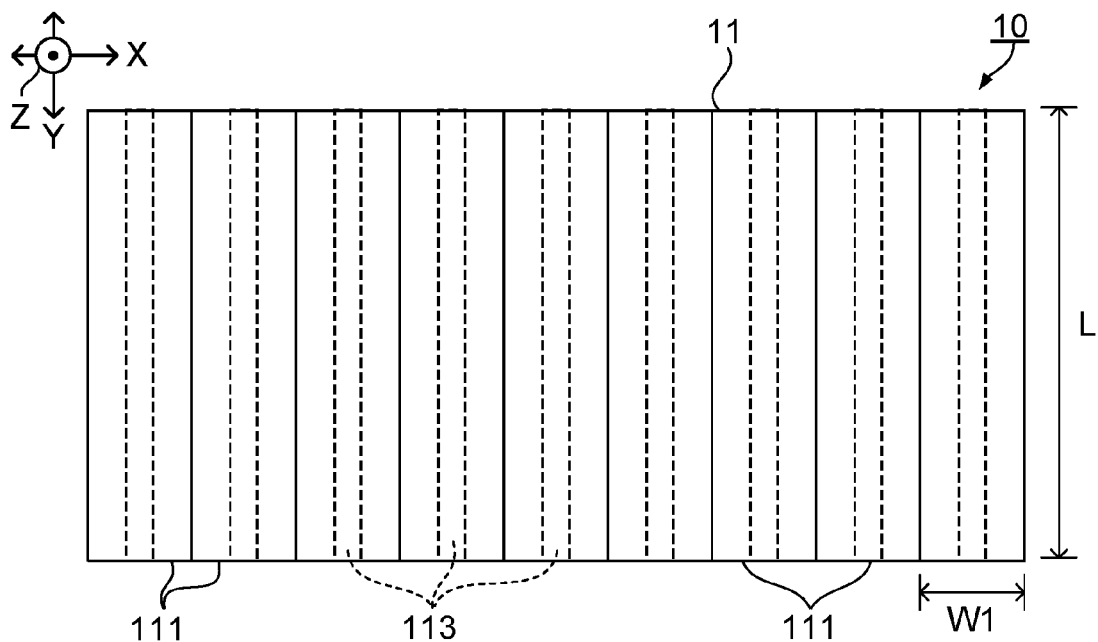
FIG. 1A is a plan view of an image display element according to Embodiment 1.
Figure 1B:
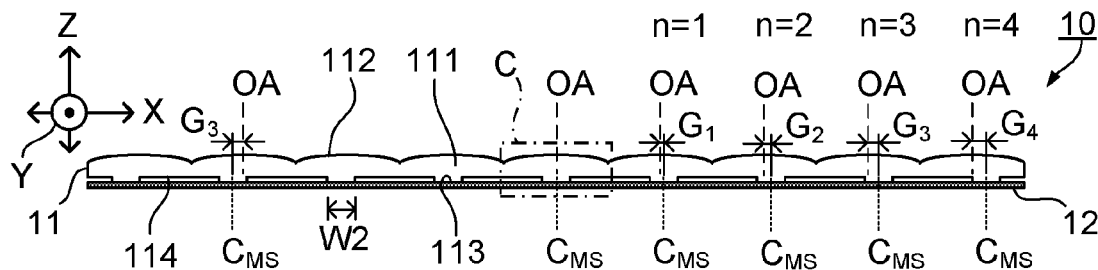
FIG. 1B is a front view of the image display element.
Figure 1C:
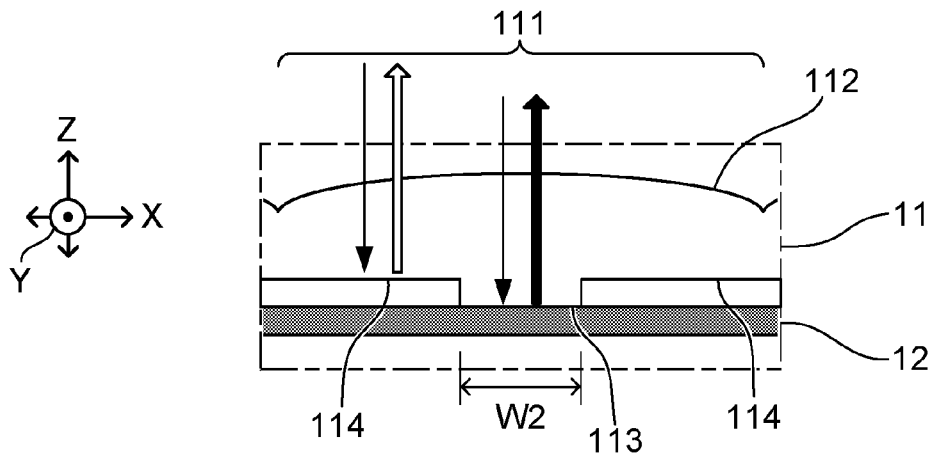
FIG. 1C is an enlarged view of portion C in FIG. 1B.

FIG. 1A is a plan view of image display element 10 according to Embodiment 1 of the present invention, FIG. 1B is a front view of image display element 10, and FIG. 1C is an enlarged view of portion C in FIG. 1B. In the drawings, X direction is one direction in a planar direction of lenticular sheet 11, Y direction is a direction orthogonal to X direction, and Z direction is a direction orthogonal to the planar direction (thickness direction).

As illustrated in FIGS. 1A, 1B, and 1C, image display element 10 includes lenticular sheet 11 and color sheet 12.

The shape of lenticular sheet 11 in plan view is rectangular and is composed of a transparent resin such as polycarbonate or an acrylic resin, for example. Lenticular sheet 11 includes a plurality of cylindrical lenses 111, which are integrally formed.

Cylindrical lens 111 is a convex lens having on the front surface side convex surface part 112 with a ridge line along Y direction as an apex part. A plurality of cylindrical lenses 111 is arranged alongside in X direction such that the respective ridge lines are in parallel with each other, so as to form lenticular sheet 11. The sizes of the respective cylindrical lenses 111 are the same; width W1 (length in X direction) of one cylindrical lens 111 is, for example, 400 µm, and length L (length in Y direction) thereof is, for example, 3 mm. Furthermore, the optical axis of cylindrical lens 111 is a straight line passing through the ridge line along Z direction.

Each of cylindrical lenses 111 includes, on the rear surface, flat surface part 113 and rough surface part 114. The shape of each of flat surface part 113 and rough surface part 114 in plan view is rectangular with Y direction as a longitudinal direction.

Flat surface part 113 is a part of the rear surface of cylindrical lens 111, which is so smooth that substantial specular reflection occurs, and one flat surface part 113 is disposed for each cylindrical lens 111. For example, in every flat surface part 113, length L and width W2 (length in X direction) are the same; width W2 is 50 µm, for example.

The position of flat surface part 113 in X direction is appropriately determined depending on applications. For example, when the application of image display element 10 is the above-mentioned marker, flat surface part 113 is disposed at a position where an image generated by flat surface part 113 is observed at a center portion of lenticular sheet 11 in X direction from the side of convex surface part 112.

For example, flat surface part 113 of cylindrical lens 111 at the center of lenticular sheet 11 in X direction (cylindrical lens 111 of portion C in FIG. 1B) is disposed at a position where the center of flat surface part 113 overlaps the optical axis of the cylindrical lens 111. Distance $D_{OA}$ between optical axes OA of adjacent cylindrical lenses 111 is constant. However, as illustrated in FIG. 1B, the distance between center $C_{MS}$ of flat surface part 113 of cylindrical lens 111 at a position spaced apart by n cylindrical lenses 111 from the above-mentioned central cylindrical lens 111 and optical axis OA of the cylindrical lens 111 at a position spaced apart by n cylindrical lenses is 5×µm. Thus, flat surface part 113 of cylindrical lens 111 at a position spaced apart further from this central cylindrical lens 111 is disposed more externally than the optical axis of this cylindrical lens 111.

Rough surface part 114 is a part of the rear surface of lenticular sheet 11 other than flat surface part 113. Rough surface part 114 has a surface which is made rough such that diffuse reflection optically distinguishable obviously from the specular reflection in flat surface part 113 occurs. For example, surface roughness Ra of rough surface part 114 is 3 to 30 µm.

Figure 2:
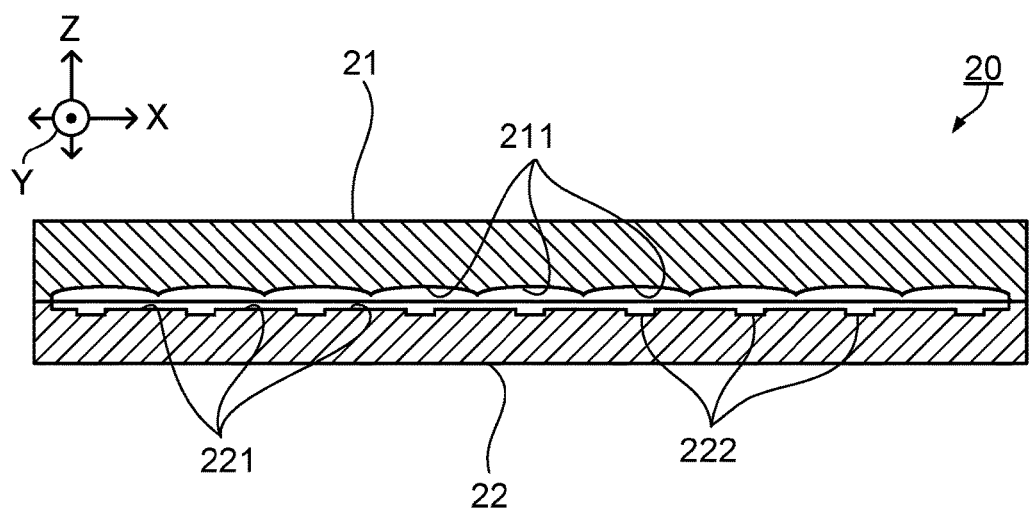
FIG. 2 is a cross-sectional view of a mold used for producing by injection molding a lenticular sheet in Embodiment 1.

Lenticular sheet 11 can be produced by injection molding, for example. The injection molding can be performed by using a mold as illustrated in FIG. 2. FIG. 2 is a cross-sectional view of mold 20 used in producing lenticular sheet 11 by injection molding.

Mold 20 includes upper mold 21 and lower mold 22. On the inner surface of a cavity at upper mold 21, a plurality of concave surface parts 211 lined in parallel which corresponds to the surface shape of convex surface part 112 are formed.

The inner surface of the cavity at lower mold 22 includes rough surface parts 221 corresponding to rough surface parts 114 and linear recess parts 222 corresponding to flat surface parts 113. The surface of rough surface part 221 is made rough to have the same roughness as rough surface part 114 (e.g., Ra=3 to 30 µm). Linear recess part 222 is formed by cutting rough surface part 221, and has a smooth bottom surface. The depth of linear recess part 222 from rough surface part 221 is the same as the height of projection of flat surface part 113 from rough surface part 114, and is 0 to 50 µm, for example.

Color sheet 12 is a sheet made of resin exhibiting a color such as black, for example. Color sheet 12 may be either a sheet of colored resin, or a resin-made sheet coated with paint. Alternatively, only a portion of color sheet 12, which corresponds to flat surface part 113 of cylindrical lens 111, may also be directly colored. Examples of the coloring method include a method in which the portion other than a portion corresponding to flat surface part 113 of cylindrical lens 111 is masked, and the unmasked portion is colored by vapor deposition, and a method in which a predetermined color paint is applied to only a portion corresponding to flat surface part 113 of cylindrical lens 111. Color sheet 12 is bonded to flat surface part 113 by, for example, adhesion using an adhesive, or fusion bonding of color sheet 12.

(Action)

As illustrated in FIG. 1C, light having reached flat surface part 113 among light incident on cylindrical lens 111 is specularly reflected at flat surface part 113 or absorbed by color sheet 12 because color sheet 12 is bonded to flat surface part 113. On the other hand, light having reached rough surface part 114 among light incident on cylindrical lens 111 is diffusely reflected at rough surface part 114.

Accordingly, at convex surface part 112, portions exhibiting white color corresponding to rough surface parts 114 and a portion exhibiting the same color as color sheet 12 corresponding to flat surface part 113 between the portions exhibiting white color, i.e., a linear black image along Y direction are observed.

Flat surface part 113 is disposed appropriately depending on the distance from the center of image display element 10 in X direction. Accordingly, when image display element 10 is observed from the side of the surface of lenticular sheet 11, a dark-colored image is observed, in which linear black images generated by flat surface parts 113 are integrated.

For example, when image display element 10 is viewed from the center of lenticular sheet 11 in X direction, the dark-colored image is observed at the center portion in X direction. When image display element 10 is observed while an angle relative to the above-mentioned optical axis of cylindrical lens 111 in X direction is changed, the position of the dark-colored image in X direction is changed depending on that angle. Accordingly, an angle of the observation position of image display element 10 in X direction is determined from the position in X direction of the dark-colored image observed on the side of convex surface part 112 of lenticular sheet 11, so that image display element 10 functions as the above-mentioned marker.

In order for image display element 10 to function as the marker, it is necessary to regulate an error in the position of flat surface part 113 in X direction on the order of several micrometers; flat surface parts 113 and rough surface parts 114 are formed simultaneously with the injection molding of lenticular sheet 11. For this reason, no error in the position of flat surface part 113 in X direction substantially occurs. Therefore, image display element 10 is produced at low cost and high yield.

(Modification)

Next, an image display element according to a modification of Embodiment 1 will be described. The image display element according to the modification of Embodiment 1 can be configured in a manner similar to that of the image display element or marker disclosed in the above-mentioned related art, except that a method of forming the patterns is different.

Figure 3A:
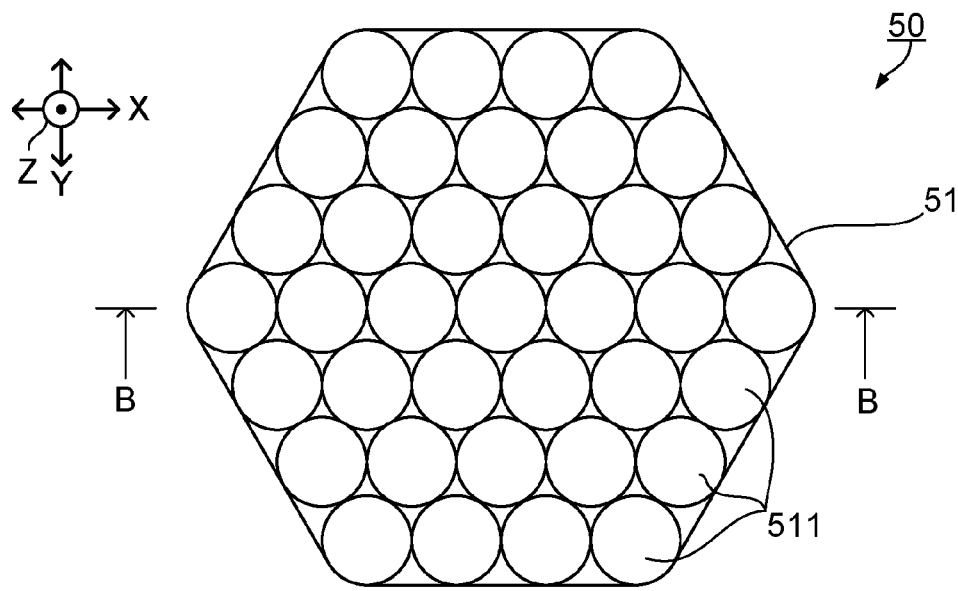
FIG. 3A is a plan view of an image display element according to a modification of Embodiment 1.
Figure 3B:
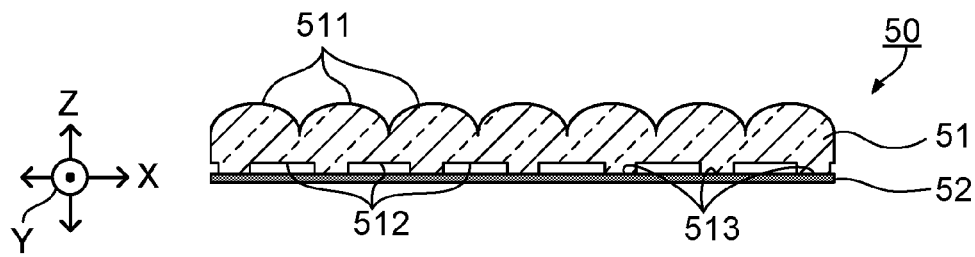
FIG. 3B is a cross-sectional view of the image display element taken along line B-B in FIG. 3A.
Figure 3C:
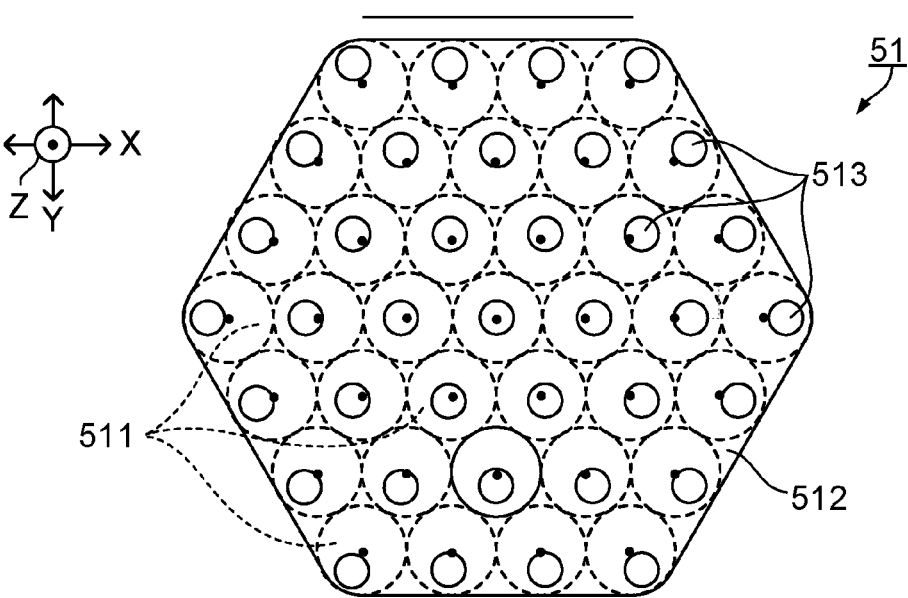
FIG. 3C is a bottom view of a group of convex lenses of the image display element.

FIG. 3A is a plan view of image display element 50 according to a modification of Embodiment 1, FIG. 3B is a cross-sectional view of image display element 50 taken along line B-B in FIG. 3A, and FIG. 3C is a bottom view of a group of convex lenses of image display element 50. Image display element 50 includes convex lens group 51 and color sheet 52. Color sheet 52 is configured in a manner similar to that of color sheet 12 described above, except that color sheet 52 is substantially hexagonal in plan view.

Convex lens group 51 is composed of an injection molded article of a transparent resin. The shape of convex lens group 51 in plan view is substantially hexagonal. Convex lens group 51 is formed in such a shape that a plurality of circular convex lenses in plan view are disposed most densely on a plane. In the surface of convex lens group 51, a plurality of convex surface parts 511 corresponding to the convex lenses are formed. The rear surface of convex lens group 51 includes rough surface part 512 and a plurality of flat surface parts 513 protruding from rough surface part 512.

Rough surface part 512 has surface roughness similar to that of rough surface part 114 described above and is formed in a way similar to that of rough surface part 114. Flat surface part 513 is a top surface of a circular plate part protruding from the rear surface of convex lens group 51. The shape of flat surface part 513 in plan view is circular. Other than those described above, flat surface part 513 is formed smoothly as with flat surface part 113 described above. As illustrated in FIG. 3C, flat surface parts 513 are disposed such that, as flat surface part 513 is away from the central convex lens in the planar direction, flat surface part 513 is away from the optical axis of each convex lens toward the direction away from the central convex lens. Note that, black points in FIG. 3C indicate the positions of the optical axes of the respective convex lenses. The distance between the optical axes of adjacent convex lenses is constant.

Convex lens group 51 described above can also be produced extremely precisely by injection molding as with lenticular sheet 11 described above. As illustrated in PTL 2, in image display element 50, dark-colored images in which black points generated by flat surface parts 513 are integrated are observed when observed from the side of convex part 513, and the positions of the dark-colored images change depending on the viewing angle from the side of convex surface part 511. Therefore, image display element 50 is used as a rotation angle measuring marker in which images are moved in the planar direction depending on the viewing angle.

(Effects)

As is obvious from the above description, image display element according to Embodiment 1 is an image display element including convex lenses each having a convex surface part on the front side, and patterns formed on the rear surface of the convex lenses in a manner corresponding to the convex surface parts, in which the patterns are composed of optically distinguishable first and second parts which are formed by the surface shape of the rear surface. Therefore, the convex lenses and the patterns can be produced integrally, which makes it possible to provide an image display element that can be produced at low cost and high yield.

From the viewpoint of providing an image display element which is applicable to a marker in one direction (e.g., X direction) and can be produced at low cost and high yield, the following are more effective: the convex lens is a cylindrical lens; the patterns include the first part or the second part formed linearly along the ridge line direction of the cylindrical lens; the first part is a rough surface part; and the second part is a flat surface part. In addition, it is more effective that the convex lens is a lenticular lens from the above-mentioned viewpoints.

It is more effective that the convex lens is an injection molded article of a transparent resin from the viewpoint of producing an image display element at low cost and high yield.

In addition, it is more effective to further include a colored layer disposed on the rear surface from the viewpoint of making clear an image to be observed on the convex surface part side.

Note that, in all the above-described embodiments, a color sheet may not be included as long as the image can be observed from the convex surface part side. For example, surface roughening may be performed to make flat surface parts 113 and 513 smaller while making rough surface parts 114 and 512 larger. Alternatively, surface roughening may be performed such that flat surface parts 113 and 513 have directivity in X direction while rough surface parts 114 and 512 have directivity in Y direction. That is, flat surface parts 113 and 513 and rough surface parts 114 and 512 are to form optically distinguishable patterns as observed from the convex surface part side, which are formed by the surface shape of the rear surface of lenticular sheet 11 or convex lens group 51.

Embodiment 2

Figure 4A:
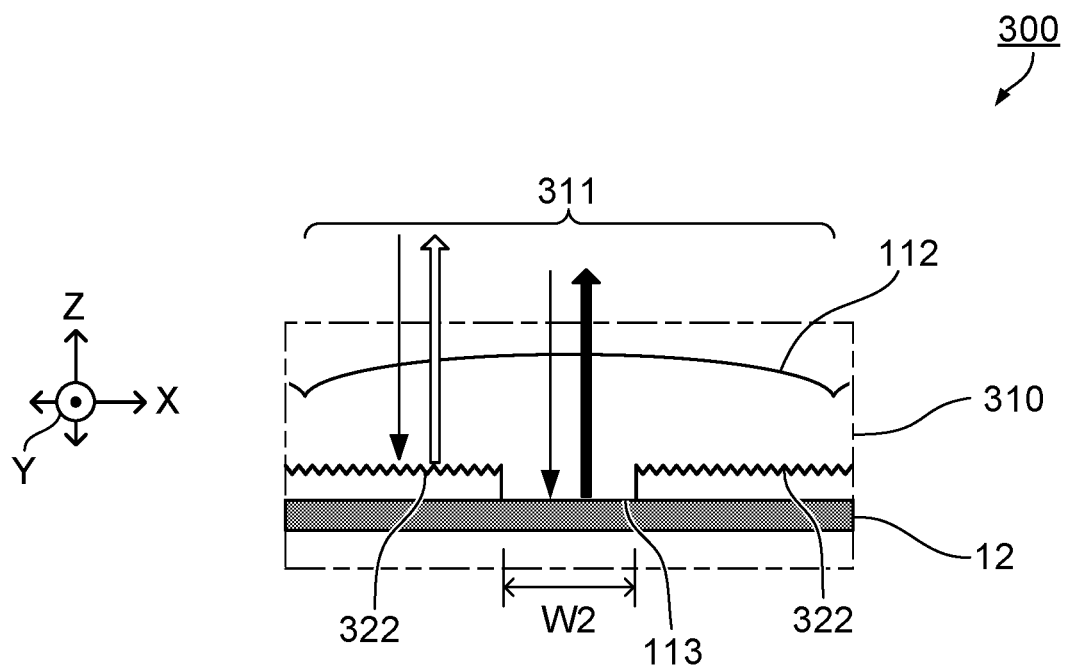
FIG. 4A is a front view of an image display element according to Embodiment 2.
Figure 4B:
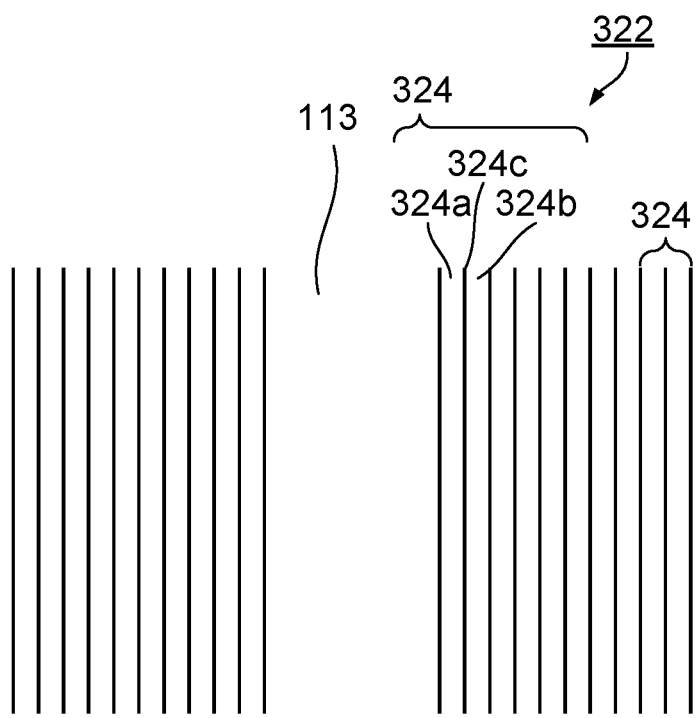
FIG. 4B is a partially enlarged bottom view of a cylindrical lens.

Next, image display element 300 according to Embodiment 2 will be described. Image display element 300 according to Embodiment 2 differs from image display element 10 according to Embodiment 1 in the shape of the rear surface of lenticular sheet 310. Thus, the same symbols are assigned to the same components as those of image display element 10 according to Embodiment 1 to omit the descriptions therefor. FIG. 4A is a front view of image display element 300, and FIG. 4B is a partially enlarged bottom view of cylindrical lens 311. Note that, FIG. 4A corresponds to FIG. 1C.

As illustrated in FIGS. 4A and 4B, image display element 300 includes lenticular sheet 310 and color sheet 12.

Lenticular sheet 310 includes a plurality of cylindrical lenses 311. Cylindrical lens 311 includes convex surface part 112 disposed on the front side, and flat surface part 113 and reflection parts 322 disposed on the rear side.

Reflection part 322 includes a plurality of linear recesses 324 or a plurality of linear protrusions. In the present embodiment, reflection part 322 including a plurality of linear recesses 324 will be described. Reflection part 322 reflects a part of light incident on convex surface part 112 at least twice toward convex surface part 112 (retroreflection). The shape of linear recess 324 is not particularly limited as long as it has at least a pair of inclined surfaces and can perform the above-described functions. Examples of the shape of linear recess 324 include a V-groove and a substantial V-groove with a valley portion being truncated. Note that, the shape of linear recess 324 is the V-groove in the present embodiment. When the shape of linear recess 324 is the substantially V-groove with a valley portion being truncated, it is not necessary to realize perfect retroreflection.

Linear recess 324 includes first surface 324a (inclined surface), and second surface 324b formed to be paired with first surface 324a (inclined surface). At the boundary between first surface 324a and second surface 324b, ridge line 324c is formed. Linear recesses 324 extend in a first direction and are arranged in a second direction perpendicular to the first direction on the rear surface. Here, the first direction may be either a direction along the ridge line of cylindrical lens 311 in plan view, or a direction orthogonal to the ridge line of cylindrical lens 311. In the present embodiment, the first direction (direction in which linear recesses extend) is a direction along the ridge line of cylindrical lens 311 in plan view (Y direction).

A part of light incident on convex surface part 112 of cylindrical lens 311 is reflected by first surface 324a. Then, the light reflected by first surface 324a is reflected by second surface 324b toward convex surface part 112.

(Effects)

As is obvious from the above description, an image display apparatus according to Embodiment 2 is an image display element including convex lenses each having a convex surface part on the front side, and patterns formed on the rear surface of the convex lenses in a manner corresponding to the convex surface part, in which the patterns are formed by the surface shape of the rear surface, the convex lens is a cylindrical lens, and the patterns are composed of a first part or a second part formed linearly along the ridge line direction of the cylindrical lens. Further, from the viewpoints of not only the effects of the image display apparatus according to Embodiment 1 but also increased contrast brought by retroreflection of light incident on a convex surface part toward the convex surface part, the following are more effective: the first part is a reflection part in which a plurality of linear recesses or a plurality of linear protrusions having a first surface that reflects a part of light incident on the convex surface part and a second surface that reflects the light reflected by the first surface toward the convex surface part are arranged in a first direction; and the second part is a flat surface part.

It is more effective that the convex lens is an injection molded article of a transparent resin from the viewpoint of producing an image display element at low cost and high yield. Further, it is more effective to further include a colored layer disposed on the rear surface, from the viewpoint of making clear an image to be observed on the convex surface part side.

(Modification)

Next, an image display element according to a modification of Embodiment 2 will be described. The image display element according to the modification of Embodiment 2 differs from image display element 50 according to the modification of Embodiment 1 only in the configuration of convex lens group 351. Thus, the same symbols are assigned to the same components as those of image display element 50 according to the modification of Embodiment 1 to omit the descriptions therefor.

Figure 5:
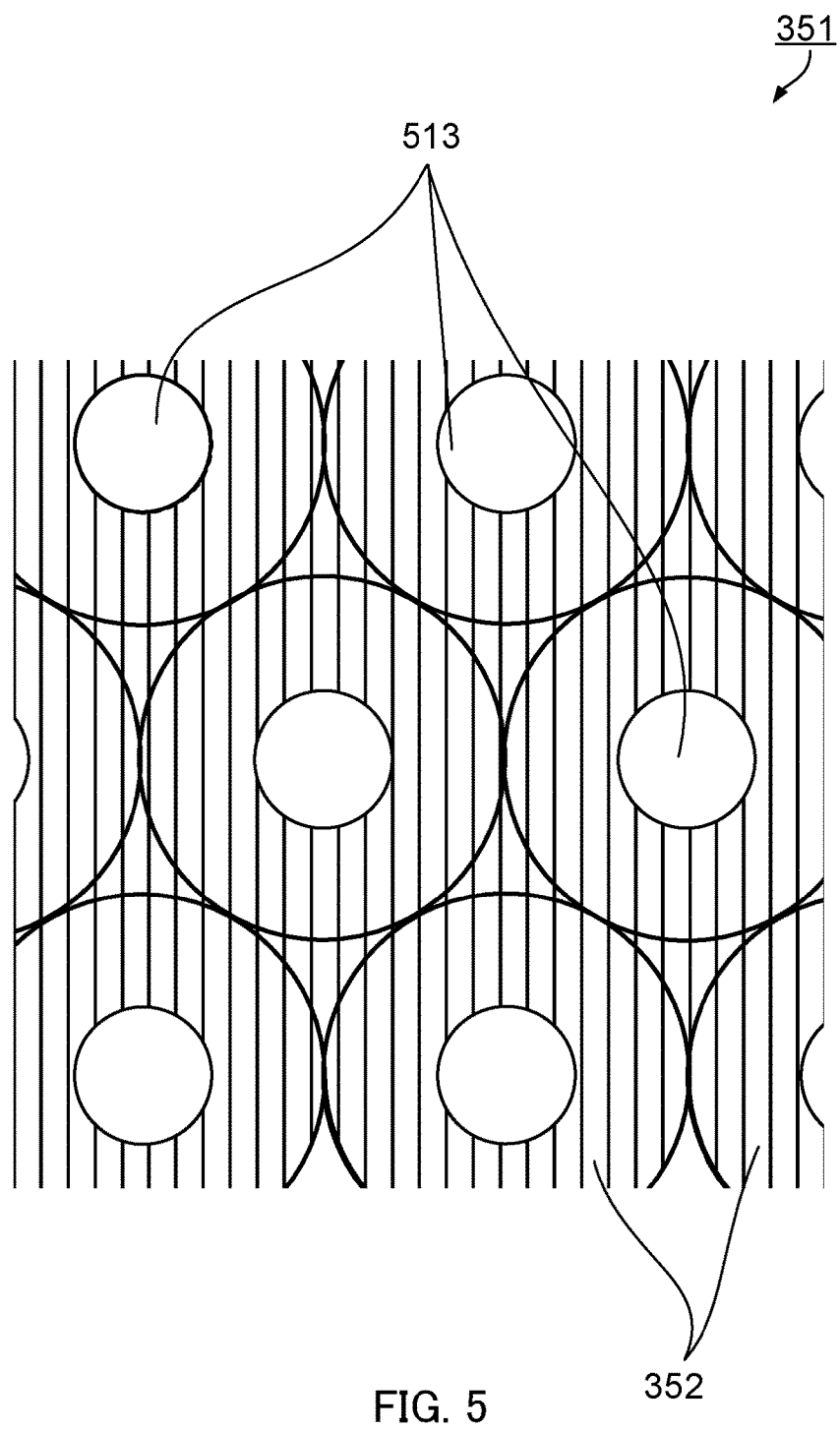
FIG. 5 is a partially enlarged bottom view of a group of convex lenses according to a modification of Embodiment 2.

FIG. 5 is a partially enlarged bottom view of convex lens group 351. The image display element according to the modification of Embodiment 2 includes convex lens group 351 and a color sheet.

Convex lens group 351 is composed of an injection molded article of a transparent resin. The surface of convex lens group 351 has a plurality of convex surface parts thereon corresponding to the convex lenses. The rear surface of convex lens group 351 includes reflection parts 352 and a plurality of flat surface parts 513 protruding from reflection parts 352. Reflection part 352 is formed in a way similar to that of reflection part 322 described above.

Embodiment 3

Figure 6A:
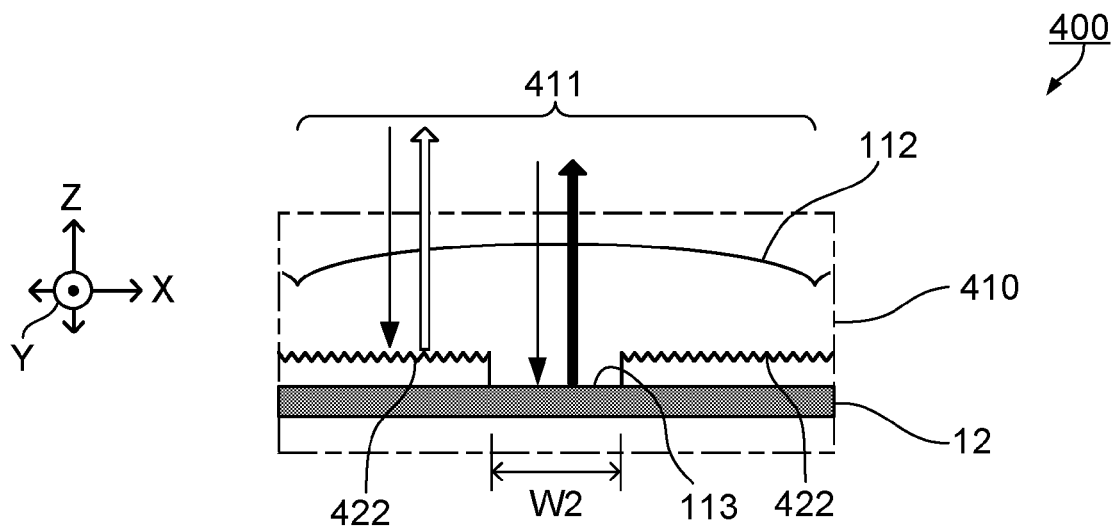
FIG. 6A is a front view of an image display element according to Embodiment 3.
Figure 6B:
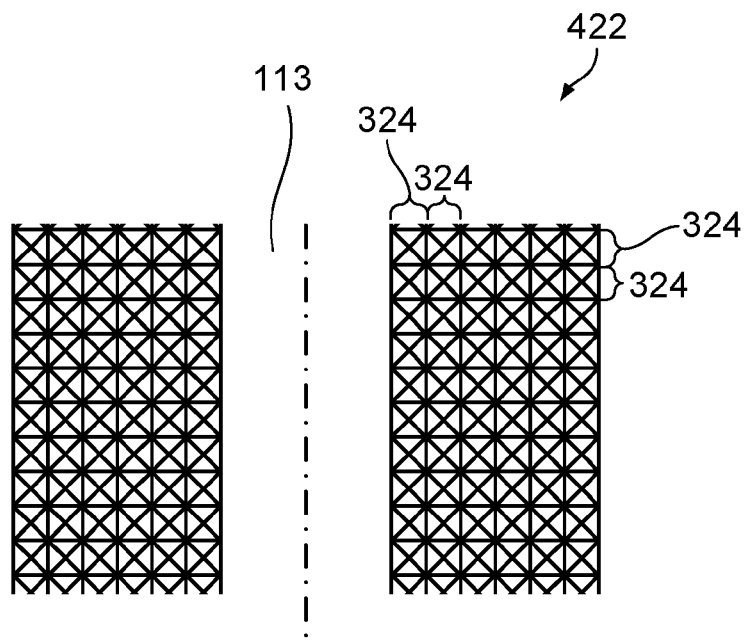
FIG. 6B is a partially enlarged bottom view of a cylindrical lens.

Next, image display element 400 according to Embodiment 3 will be described. Image display element 400 according to Embodiment 3 differs from image display elements 10 and 300 in the shape of the rear surface of lenticular sheet 410. Thus, the same symbols are assigned to the same components as those of image display elements 10 and 300 according to Embodiments 1 and 2 to omit the descriptions therefor. FIG. 6A is a front view of image display element 400, and FIG. 6B is a partially enlarged bottom view of cylindrical lens 411. Note that, FIG. 6A corresponds to FIG. 1C.

As illustrated in FIGS. 6A and 6B, image display element 400 includes lenticular sheet 410 and color sheet 12.

Lenticular sheet 410 includes a plurality of cylindrical lenses 411. Further, cylindrical lens 411 includes convex surface part 112 disposed on the front side, and flat surface part 113 and reflection parts 422 disposed on the rear side.

Reflection part 422 includes a plurality of linear recesses 324 or a plurality of linear protrusions. In the present embodiment, reflection part 422 including a plurality of linear recesses 324 will be described. Linear recesses 324 extend in a first direction, and are arranged in a second direction perpendicular to the first direction; and at the same time extend in the second direction, and are arranged in the first direction. That is, reflection part 422 includes a plurality of linear recesses 324 being arranged orthogonal to each other.

(Effects)

As is obvious from the above description, an image display apparatus according to Embodiment 3 is an image display element including convex lenses each having a convex surface part on the front side, and patterns formed on the rear surface of the convex lenses in a manner corresponding to the convex surface part, in which the patterns are formed by the surface shape of the rear surface, the convex lens is a cylindrical lens, and the patterns are composed of a first part or a second part formed linearly along the ridge line direction of the cylindrical lens. Further, from the viewpoints of not only the effects of the image display apparatus according to Embodiment 1 but also increased contrast brought by retroreflection of the majority of light incident on a convex surface part further toward the convex surface part, the following are more effective: the first part is a reflection part in which a plurality of linear recesses or a plurality of linear protrusions having a first surface that reflects a part of light incident on the convex surface part and a second surface that reflects the light reflected by the first surface toward the convex surface part are arranged in a first direction and a second direction orthogonal to the first direction; and the second part is a flat surface part.

(Modification)

Next, an image display element according to a modification of Embodiment 3 will be described. The image display element according to the modification of Embodiment 3 differs from image display elements 50 and 300 according to the modifications of Embodiments 1 and 2, respectively, only in the configuration of convex lens group 451. Thus, the same symbols are assigned to the same components as those of image display elements 50 and 300 according to the medication of Embodiments 1 and 2 to omit the descriptions therefor.

Figure 7:
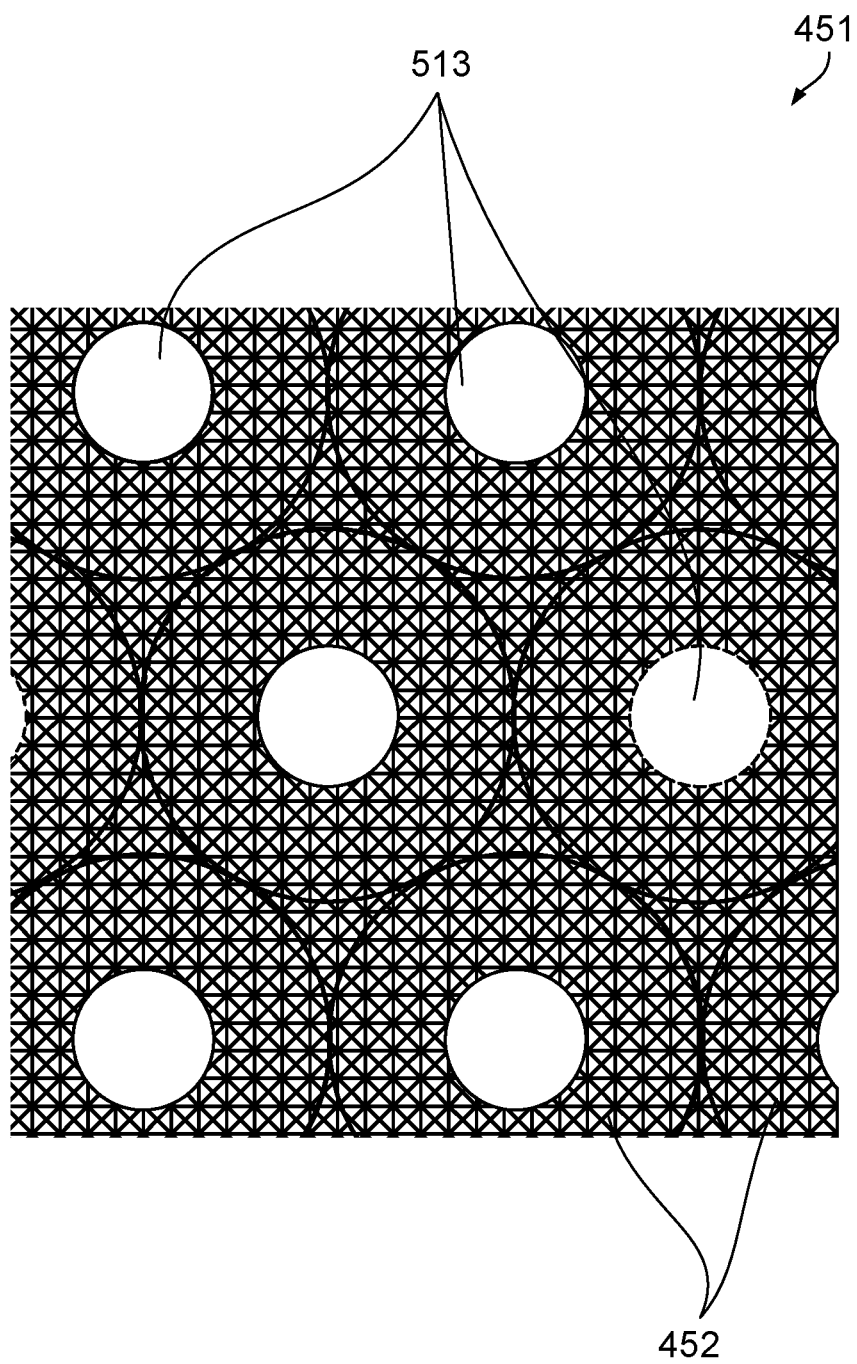
FIG. 7 is a partially enlarged bottom view of a group of convex lenses according to a modification of Embodiment 3.

FIG. 7 is a bottom view of convex lens group 451. The image display element includes convex lens group 451 and a color sheet.

Convex lens group 451 is composed of an injection molded article of a transparent resin. The surface of convex lens group 451 has a plurality of convex surface parts thereon corresponding to the convex lenses. The rear surface of convex lens group 451 includes reflection parts 452 and a plurality of flat surface parts 513 protruding from rough surface parts 512. Reflection part 452 is formed in a manner similar to that of reflection part 422 described above.

It is more effective that the convex lens is an injection molded article of a transparent resin from the viewpoint of producing an image display element at low cost and high yield. Further, it is more effective to further include a colored layer disposed on the rear surface, from the viewpoint of making clear an image to be observed on the convex surface part side.

In addition, in all the above-described modifications of the embodiments, the shape of each individual convex lens composed of convex surface parts 112 and 511 in plan view may be rectangular other than the above-mentioned circular shape, and can be determined appropriately as long as the shape enables the convex lens to function properly.

In all the above-described embodiments, convex surface parts 112 and 511 may be composed of a flat surface, spherical surface, aspherical surface, free curved surface, or the like.

In all the above-described embodiments, the color sheet may be a colored layer such as a paint-coated film. Further, the color sheet may be bonded only to a flat surface part and may not be disposed on a rough surface part.

In all the above-described embodiments, a part to be observed as an image (flat surface part) when observed from the side of convex surface parts 112 and 511 is colored. However, for example, flat surface parts 113 and 513 may also be employed as a rough surface part or a reflection part; and rough surface parts 114, 221 and 521, or reflection parts 322, 352, 422, and 452 may also be employed as a flat surface part. In these cases, white images are observed in a black background.

In Embodiments 2 and 3 described above, reflection parts 322, 352, 422, and 452 may also include a plurality of linear protrusions instead of a plurality of linear recesses. In this case, the cross-sectional diameter shape in the width direction of the linear protrusion may be either triangular or substantially triangular with vertices being truncated.

Figure 8A:
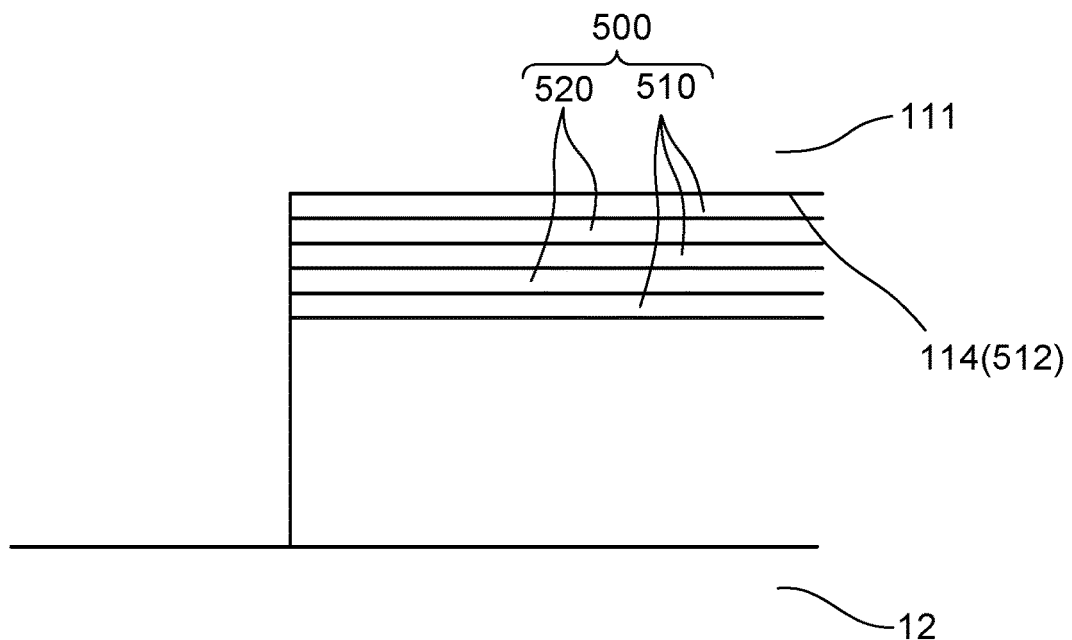
FIGS. 8A and 8B are explanatory schematic diagrams of an antireflection film.
Figure 8B:
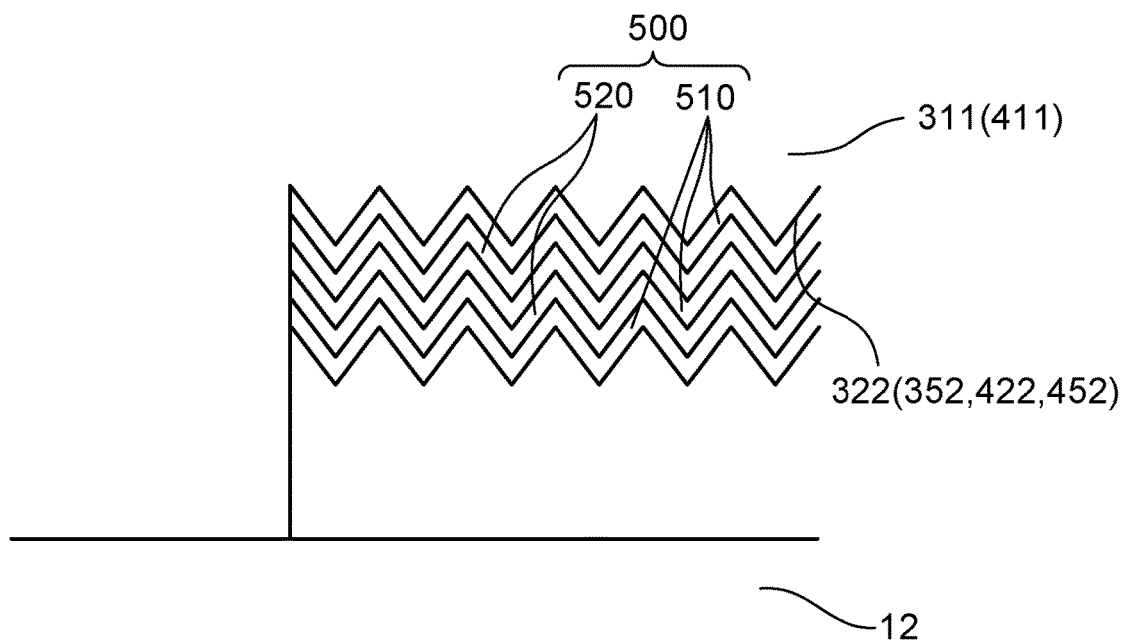

As illustrated in FIGS. 8A and 8B, rough surface parts 114 and 512 or reflection parts 322, 352, 422, and 452 may also include antireflection film 500 formed therein. Examples of antireflection film 500 include a layered film in which $SiO_2$ films 510 and $TiO_2$ films 520 are layered alternately.

INDUSTRIAL APPLICABILITY

The image display element according to the present invention is advantageous as a marker for recognizing the position or posture of an object. Further, the present invention is expected to make contributions not only to advancements in the technical field of the marker, but also to advancements in various technical fields requiring highly precise patterning of the convex lens.

REFERENCE SIGN LIST 10, 50, 300, 400 Image display element
11, 310, 410 Lenticular sheet
12, 52 Color sheet
20 Mold
21 Upper mold
22 Lower mold
51, 351, 451 Convex lens group
111, 311, 411 Cylindrical lens
112, 511 Convex surface part
113, 513 Flat surface part
114, 221, 512 Rough surface part
211 Concave surface part
222 Linear recess part
322, 352, 422, 452 Reflection part
324 Linear recess
324a First surface
324b Second surface
324c Ridge line
500 Antireflection film
510 $SiO_2$ film
520 $TiO_2$ film

What is claimed is:

1. A marker comprising:
    a plurality of convex lenses respectively including a plurality of convex surface parts on a front side; and
    a plurality of patterns formed on a rear surface of the plurality of convex lenses, the plurality of patterns respectively corresponding to the plurality of convex surface parts,
    wherein each of the plurality of patterns is composed of optically distinguishable first and second parts formed by a surface shape of the rear surface, each second part corresponding to one of the plurality of convex surface parts,
    wherein a distance between each optical axis of each of the plurality of convex lenses is constant,
    wherein a center-to-center distance between each second part is different from the distance between each optical axis, and wherein a positional relationship between each second part and one of the plurality of convex lenses corresponding to each other differs among the plurality of convex lenses in a direction perpendicular to optical axes of the plurality of convex lenses.

2. The marker according to claim 1,
wherein each first part is a rough surface part, and
wherein each second part is a flat surface part.

3. The marker according to claim 1,
wherein each first part is a reflection part in which a plurality of linear recesses or a plurality of linear protrusions each having a first surface that reflects a part of light incident on the convex surface part and a second surface that reflects the light reflected by the first surface toward the convex surface part are arranged regularly, and
wherein each second part is a flat surface part.

4. The marker according to claim 1, wherein the plurality of convex lenses are an integrally injection molded article of a transparent resin.

5. The marker according to claim 1, further comprising:
a colored layer disposed on the rear surface.

* * * * *